(12) United States Patent
Furukawa et al.

(10) Patent No.: US 10,576,845 B2
(45) Date of Patent: Mar. 3, 2020

(54) VEHICLE SEAT

(71) Applicant: TOYOTA BOSHOKU KABUSHIKI KAISHA, Aichi (JP)

(72) Inventors: Kenji Furukawa, Aichi (JP); Teruyuki Shimizu, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/938,121

(22) Filed: Mar. 28, 2018

(65) Prior Publication Data

US 2018/0281629 A1 Oct. 4, 2018

(30) Foreign Application Priority Data

Apr. 3, 2017 (JP) ................................. 2017-073624

(51) Int. Cl.
*B60N 2/10* (2006.01)
*B60N 2/64* (2006.01)
*B60N 2/68* (2006.01)
*B60N 2/70* (2006.01)

(52) U.S. Cl.
CPC ................ *B60N 2/10* (2013.01); *B60N 2/64* (2013.01); *B60N 2/68* (2013.01); *B60N 2/70* (2013.01)

(58) Field of Classification Search
CPC ... B60N 2/10; B60N 2/64; B60N 2/68; B60N 2/70

USPC ......................................................... 297/313
See application file for complete search history.

(56) References Cited

U.S. PATENT DOCUMENTS

| 4,495,887 A * | 1/1985 | Mondrush | A47C 17/161 297/118 |
| 7,850,220 B2 * | 12/2010 | Holdampf | B60N 2/3011 296/65.09 |
| 9,193,281 B2 * | 11/2015 | Elton | B60N 2/045 |
| 2009/0256379 A1 * | 10/2009 | Yamada | B60N 2/22 296/65.08 |
| 2010/0253110 A1 * | 10/2010 | Yamada | B60N 2/161 296/65.08 |
| 2011/0074199 A1 | 3/2011 | Sprenger et al. | |

FOREIGN PATENT DOCUMENTS

JP 2009-523090 6/2009

* cited by examiner

*Primary Examiner* — Mark R Wendell
(74) *Attorney, Agent, or Firm* — Greenblum & Bernstein, P.L.C.

(57) ABSTRACT

A vehicle seat to be mounted on a vehicle is provided. The vehicle seat includes a cushion frame, a back frame, a leg portion that couples the cushion frame to the vehicle side on a seat front side of the back frame. The leg portion includes a leg body extending downward from the cushion frame, and a fixing portion fixing the leg body to at least one of the cushion frame and the vehicle side. The fixing portion is displaced in a seat front or seat rear direction with respect to the leg body.

3 Claims, 7 Drawing Sheets

VEHICLE SEAT

CROSS-REFERENCE TO RELATED APPLICATIONS

This application claims the benefit of Japanese Patent Application No. 2017-073624 filed on Apr. 3, 2017 with the Japan Patent Office, the entire disclosure of which is incorporated herein by reference.

BACKGROUND

The present disclosure relates to a vehicle seat to be mounted on a vehicle.

The vehicle seat has a cushion frame, and a back frame. The cushion frame forms a frame of a seat cushion which supports the buttocks of a seat occupant.

The back frame forms a frame of a seatback which supports the back of the seat occupant. The back frame is coupled to a seat rear end side of the cushion frame. For example, a cushion frame of a vehicle seat described in Japanese Unexamined Patent Application Publication No. 2009-523090 (Patent Document 1) is coupled and fixed to the vehicle side via leg portions.

SUMMARY

In the vehicle seat described in Patent Document 1, a position of a seat front end side of the cushion frame is restricted by the leg portions such as lifter links. Therefore, when a load in a seat rear direction is applied to the back frame, an upward bending moment centering a coupling portion with the back frame is applied to the cushion frame.

When the above-described load is applied to the back frame, there is a possibility that bending stress concentrates on a substantially central portion in a seat front-rear direction of the cushion frame. In one aspect of the present disclosure, it is preferable to provide a vehicle seat that can reduce stress concentration generated in the cushion frame.

A vehicle seat in one aspect of the present disclosure includes: a cushion frame forming a frame of a seat cushion; a back frame forming a frame of a seatback and coupled to a seat rear end of the cushion frame; and a leg portion that couples a cushion frame to a vehicle side on a seat front side of a back frame. The leg portion includes a leg body extending downward from the cushion frame, and a fixing portion fixing the leg body to at least one of the cushion frame and the vehicle side. The fixing portion is displaced in a seat front or seat rear direction with respect to the leg body.

Therefore, when a load is applied to the leg portion via the cushion frame, the load generates a bending moment (M) in the leg portion. On the other hand, a load applied to the leg portion according to Patent Document 1 acts as a tensile force on the leg portion.

When magnitudes of the loads are the same, bending stress is usually larger than tensile stress. Therefore, the leg portion according to the present disclosure has lower rigidity than the leg portion according to Patent Document 1 with respect to the load.

Since energy due to the load applied to the back frame is generally distributed in accordance with magnitude of rigidity, a large amount of energy as compared to the prior art is distributed to a portion where rigidity is lower than in the prior art.

Therefore, according to the present disclosure, it is possible to disperse at least a part of the energy conventionally concentrated in the substantially central portion in the seat front-rear direction of the cushion frame to the leg portion. In addition, it is possible to reduce stress concentration generated in the substantially central portion in the seat front-rear direction of the cushion frame.

The present disclosure may be configured as follows.

It is desirable that an upper end of the leg body is coupled to the cushion frame, the fixing portion is provided on a fixing bracket to which a lower end of the leg body is coupled, and the fixing portion is fixed to the vehicle side. The leg body can swing about the cushion frame via a coupling portion with the cushion frame, and can swing about the fixing bracket via a coupling portion with the fixing bracket.

It is desirable that a coupling portion of the fixing bracket to which the leg body is coupled has higher rigidity than the fixing portion. As a result, since energy can be induced near a boundary between the coupling portion and the fixing portion, the stress concentration in the substantially central portion in the seat front-rear direction of the cushion frame can be reliably reduced.

The vehicle seat of the present disclosure may include a base that fixes the fixing bracket to the vehicle side and to which the fixing portion is fixed. A gap may be provided between a bottom surface of the coupling portion and an top surface portion of the base. This makes it possible to reliably bend and deform the coupling portion of the fixing bracket.

It is desirable that the fixing portion is displaced in the seat rear direction with respect to the leg body. As a result, rigidity of the leg portion is reduced as compared to a configuration in which the fixing portion is displaced in the seat front direction with respect to the leg body. Therefore, it is possible to reliably reduce stress concentration in the substantially central portion in the seat front-rear direction of the cushion frame. Needless to say, the configuration in which the fixing portion is displaced in the seat front direction with respect to the leg body can also reduce stress concentration in the substantially central portion in the seat front-rear direction of the cushion frame, as compared to the prior art.

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENTS

An "embodiment" described below shows an example embodiment within the technical scope of the present disclosure. That is, the subject matters described in the claims are not limited to a specific configuration, structure, etc. shown in the following embodiment.

Arrows and the like indicating directions are attached to the respective figures in order to make it easy to understand relationship between the respective figures. The present disclosure is not limited to the directions attached to the respective figures.

1. Outline of Vehicle Seat

Figure 1:
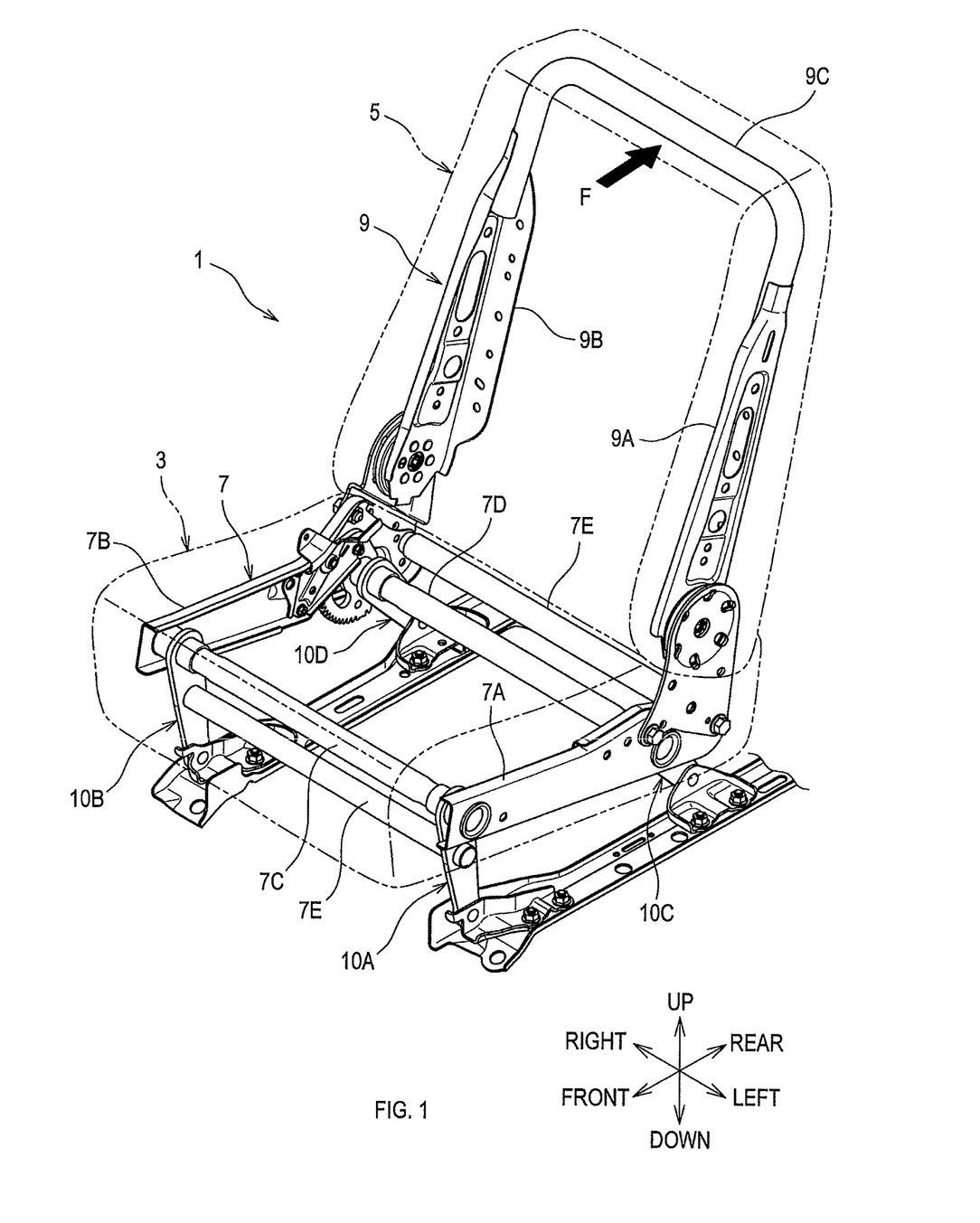
FIG. 1 is a perspective view of a vehicle seat according to an embodiment.

A vehicle seat 1 of the present embodiment includes a seat cushion 3, and a seatback 5.

The seat cushion 3 is a member for supporting the buttocks of a seat occupant. The seatback 5 is a member for supporting the back of the seat occupant. The cushion frame 7 is a member forming a frame of the seat cushion 3.

The cushion frame 7 has a left side frame 7A, a right side frame 7B, and a plurality of coupling rods 7C to 7E. The left side frame 7A and the right side frame 7B are disposed on respective ends in a seat width direction, and extend in a seat front-rear direction. The plurality of coupling rods 7C to 7E extend in the seat width direction, and couples the left side frame 7A and the right side frame 7B.

The back frame 9 is a member forming a frame of the seatback 5. The back frame 9 has two side frames 9A, 9B, and an upper frame 9C.

Each of the side frames 9A, 9B is disposed on one end in the seat width direction, and extends in a substantially up-down direction. The upper frame 9C couples upper ends of the side frames 9A, 9B.

Lower ends of the side frames 9A, 9B, that is, a lower end of the back frame 9, are coupled to seat rear end sides of the left side frame 7A and the right side frame 7B, that is, a rear end of the cushion frame 7. The back frame 9 is rotatably coupled to the cushion frame 7.

Figure 2:
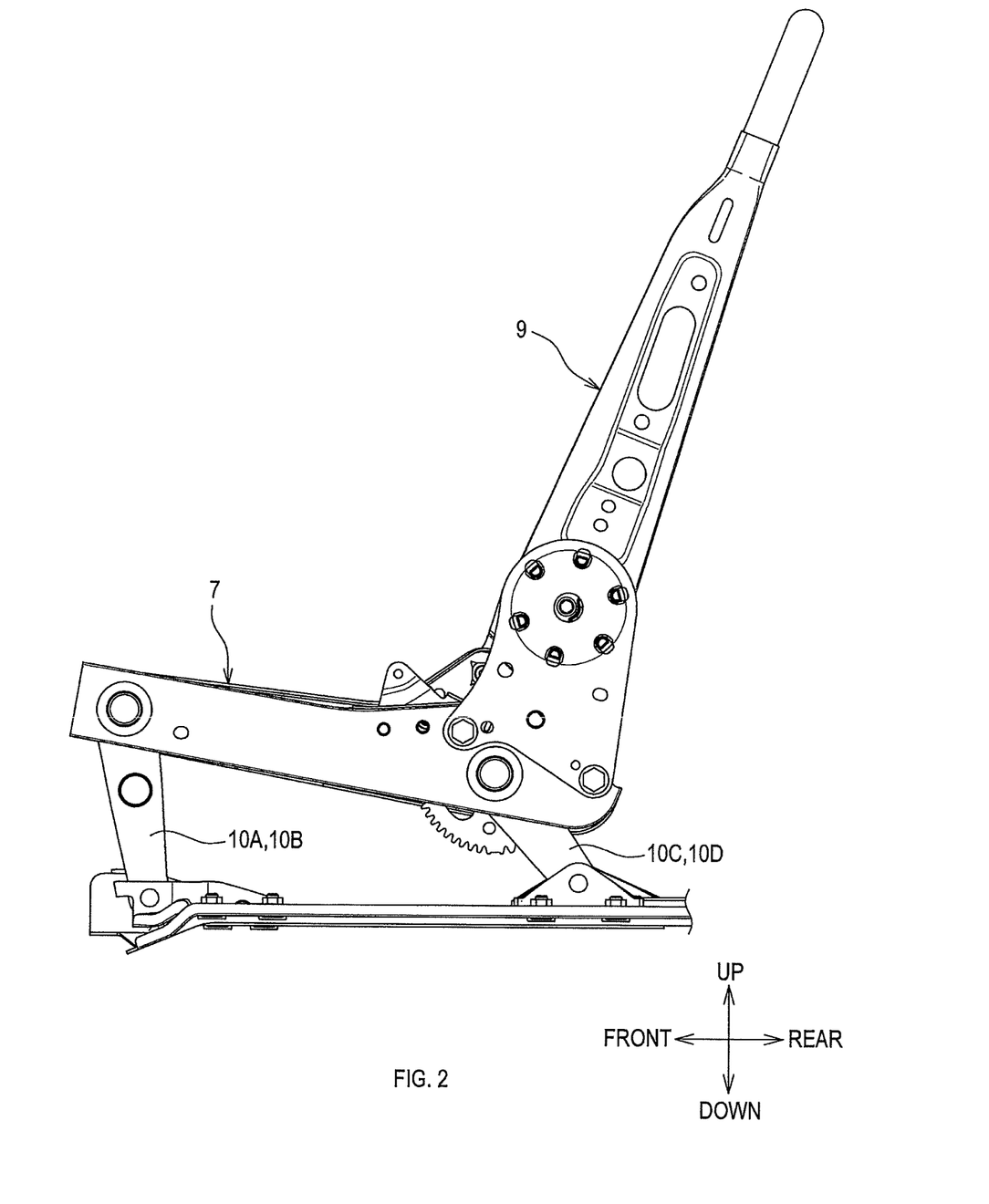
FIG. 2 is a side view of the vehicle seat according to the embodiment.

The cushion frame 7 is coupled to the vehicle side via a left front leg portion 10A, a right front leg portion 10B, a left rear leg portion 10C, and a right rear leg portion 10D. As shown in FIG. 2, the left front leg portion 10A and the right front leg portion 10B are disposed on the seat front end sides of the left side frame 7A and the right side frame 7B, and couple the front end of the cushion frame 7 to the vehicle side.

The left front leg portion 10A and the right front leg portion 10B couple the cushion frame 7 to the vehicle side on a seat front side of the back frame 9. Intermediate portions in an extending direction of the left front leg portion 10A and the right front leg portion 10B are coupled by a coupling rod 7E extending in the seat width direction.

The left rear leg portion 10C and the right rear leg portion 10D are disposed on the seat rear end sides of the left side frame 7A and the right side frame 7B and couple the seat rear end side of the cushion frame 7 to the vehicle side.

2. Structure of Leg Portions Etc.

2.1 Structure of Front Leg Portions

The left front leg portion 10A and the right front leg portion 10B have the same structure. Hereinafter, the structure of the left front leg portion 10A will be described.

Figure 3:
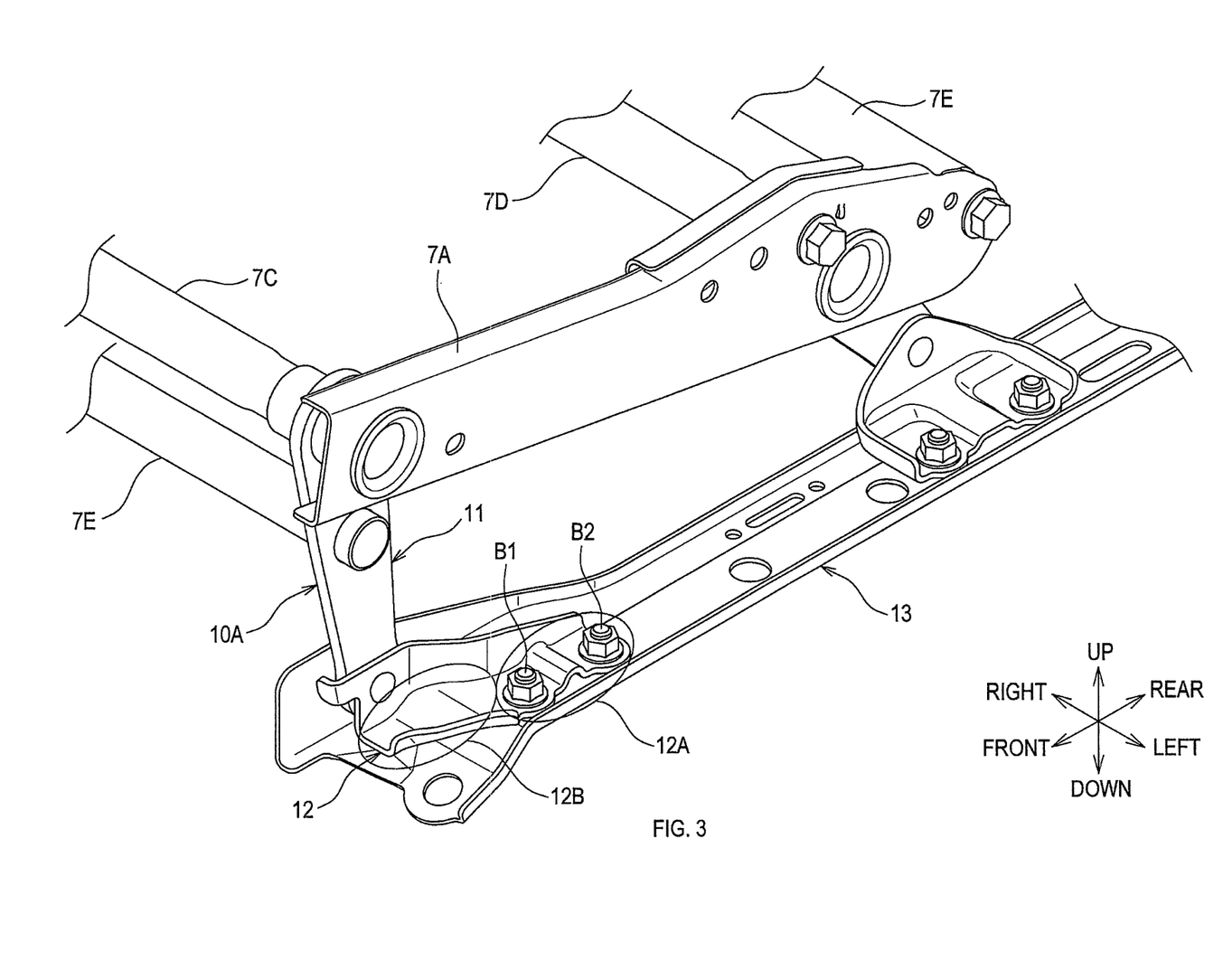
FIG. 3 is an enlarged view of a characteristic portion of the vehicle seat according to the embodiment.

As shown in FIG. 3, the left front leg portion 10A includes a leg body 11, and a fixing bracket 12. The leg body 11 is a strip-like link member extending downward from the cushion frame 7.

The fixing bracket 12 is a mounting member provided with a fixing portion 12A. The fixing bracket 12 is made of a metal member and extends in the seat front-rear direction. The fixing portion 12A is provided in a first end region in an extending direction of the fixing bracket 12. A coupling portion 12B is provided in a second end region in the extending direction of the fixing bracket 12.

The fixing portion 12A is a portion for fixing the leg body 11 to the vehicle side. The fixing portion 12A is indirectly fixed to the vehicle via a metal base 13. The base 13 may be provided in the fixing bracket 12.

The base 13 is a member for fixing the fixing bracket 12 to the vehicle side (such as a floor panel of the vehicle). The fixing portion 12A is fixed to the base 13 by mechanical fasteners such as bolts B1, B2.

The coupling portion 12B is coupled to the leg body 11. A lower end in an extending direction of the leg body 11 is coupled to the coupling portion 12B of the fixing bracket 12, so that the leg body 11 can swing about the fixing bracket 12. An upper end in the extending direction of the leg body 11 is coupled to the cushion frame 7, in particular, the left side frame 7A, so that the leg body 11 can swing about the left side frame 7A.

Figure 4:
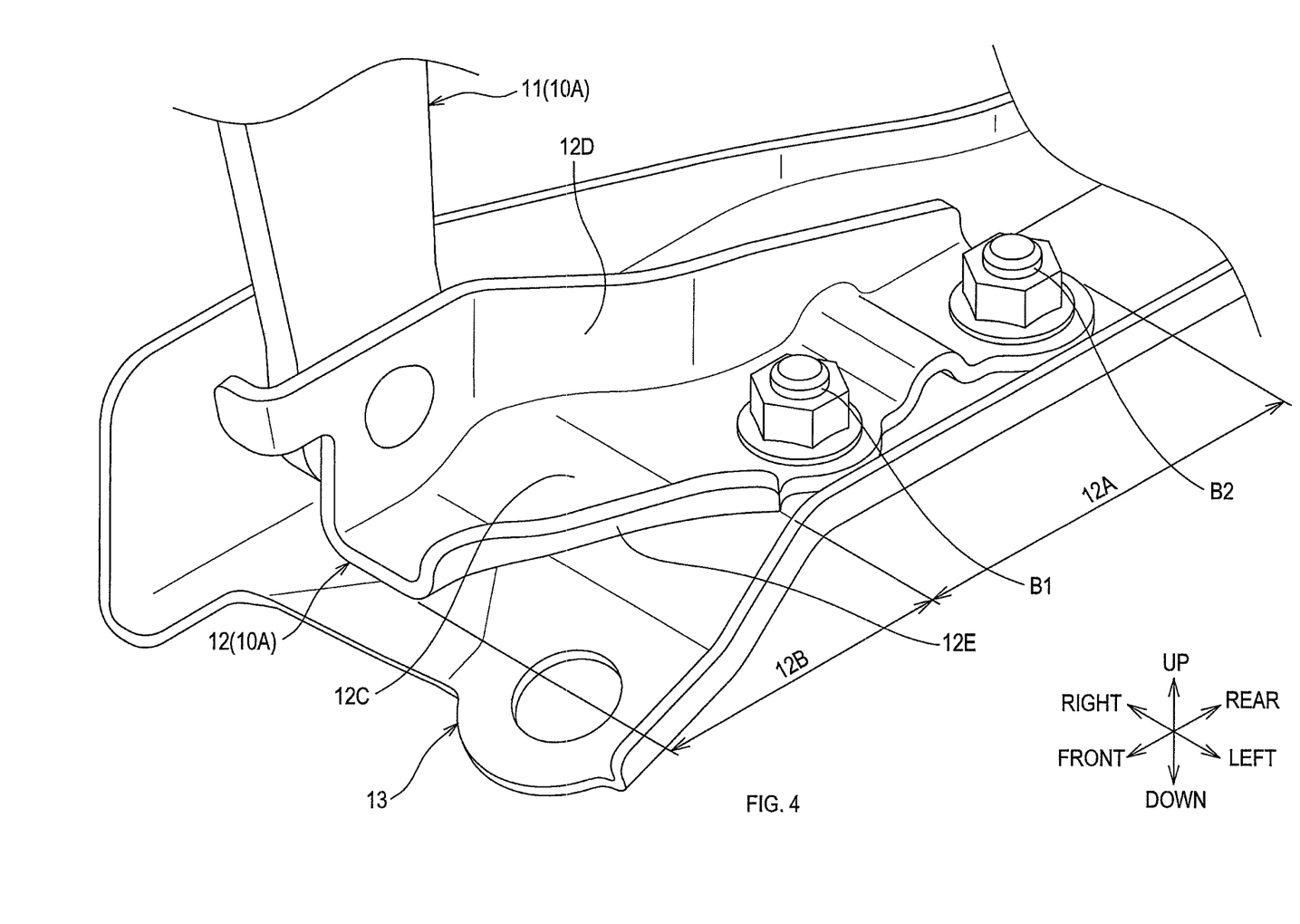
FIG. 4 is an enlarged view of a characteristic portion of the vehicle seat according to the embodiment.

As shown in FIG. 4, the fixing portion 12A is located in a region behind the coupling portion 12B (region behind the leg body 11). The fixing bracket 12 is configured so that the coupling portion 12B has higher flexural rigidity than the fixing portion 12A.

Figure 5:
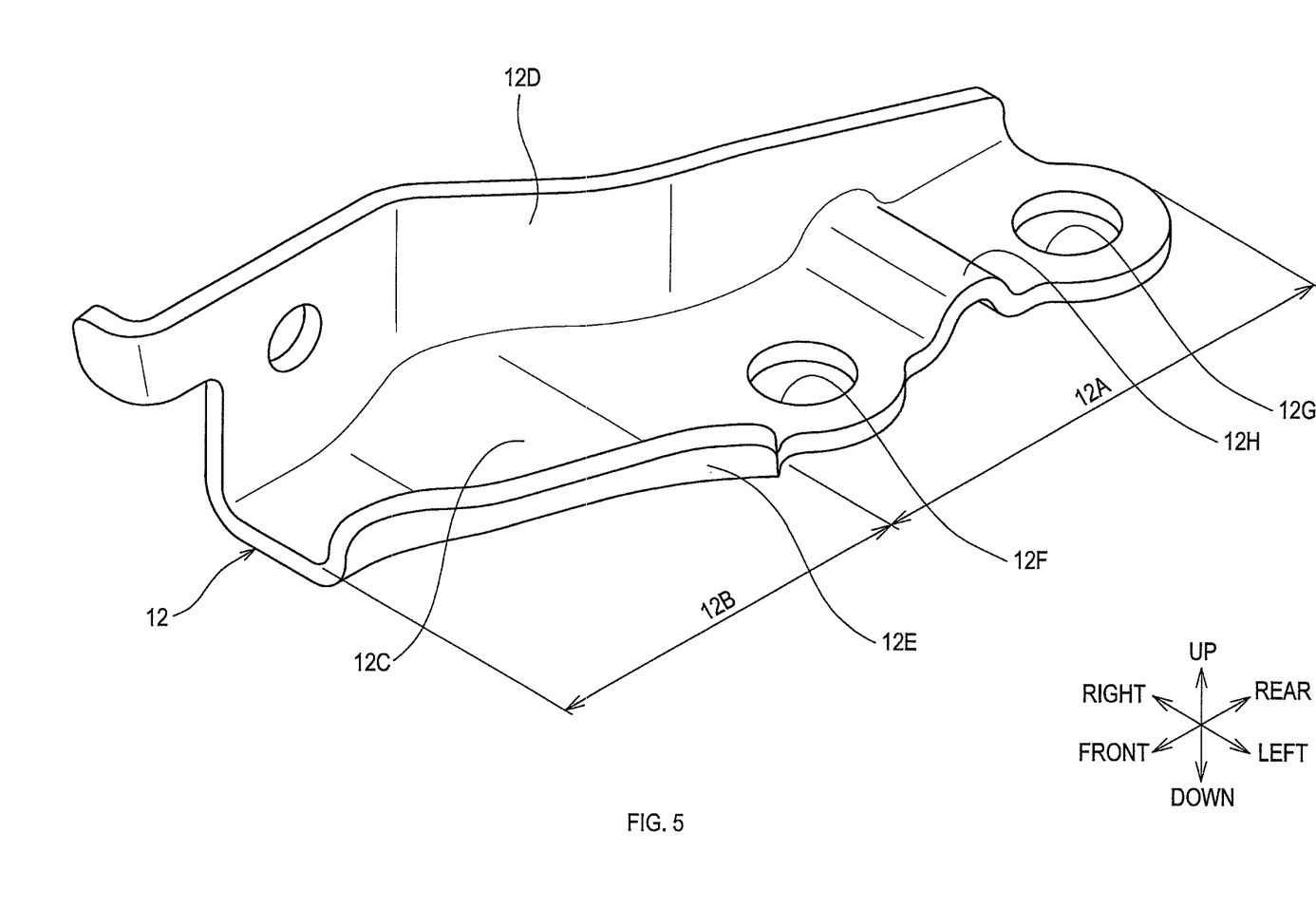
FIG. 5 is a perspective view of a fixing bracket according to the embodiment.

As shown in FIG. 5, the fixing bracket 12 has a base plate portion 12C, a first flange portion 12D, and a second flange portion 12E.

The base plate portion 12C is substantially in parallel with the base 13 or the floor panel in a state in which the fixing bracket 12 is fixed to the base 13 or the like. The base plate portion 12C is a substantially strip-like portion extending in the seat front-rear direction.

Insertion holes 12F, 12G into which the bolts B1, B2 can be inserted are provided in the first end region (rear end region in the present embodiment) in an extending direction of the base plate portion 12C. A bead portion 12H is provided between the insertion holes 12F, 12G.

The bead portion 12H is a reinforcing portion for enhancing flexural rigidity with respect to a bending moment with a line along the seat front-rear direction as a bending center line. The first flange portion 12D protrudes in the up-down direction (upward in the present embodiment) from the first end region in the seat width direction of the base plate portion 12C. The first flange portion 12D has a wall-like shape.

The second flange portion 12E protrudes in the up-down direction (upward in the present embodiment) from the second end region in the seat width direction of the base plate portion 12C. The leg body 11 is coupled to the first flange portion 12D. The second flange portion 12E has a wall-like shape.

The first flange portion 12D is provided over the substantially entire region in the extending direction of the base plate portion 12C. The second flange portion 12E is provided only in the second end region in the extending direction of the base plate portion 12C, more specifically, a region corresponding to the coupling portion 12B in the base plate portion 12C.

Therefore, the coupling portion 12B has higher flexural rigidity than the fixing portion 12A. The "flexural rigidity" herein is a flexural rigidity with respect to a bending moment with the line along the seat width direction as a bending center line.

Figure 6:
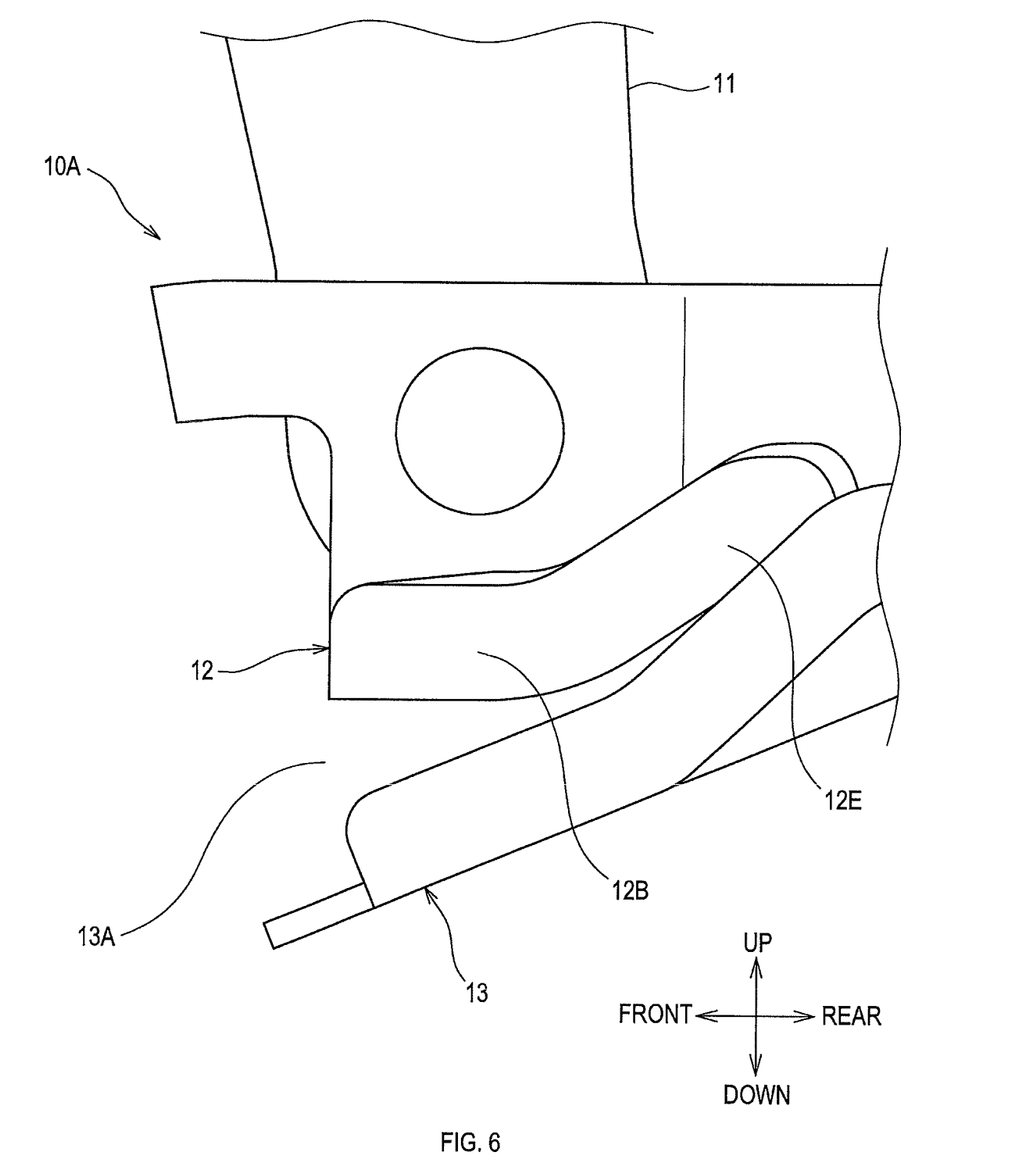
FIG. 6 is an enlarged view of a characteristic portion of the vehicle seat according to the embodiment.

As shown in FIG. 6, a gap 13A is provided between a bottom surface of the coupling portion 12B and an top surface portion of the base 13. In particular, the gap 13A is provided between the portion of the fixing bracket 12 having high flexural rigidity and the base 13.

2.2 Structure of Rear Leg Portion

Since the rear leg portion 10C and the rear leg portion 10D have the same structure, the rear leg portions 10C, 10D will be described below taking the rear leg portion 10C as an example.

Figure 7:
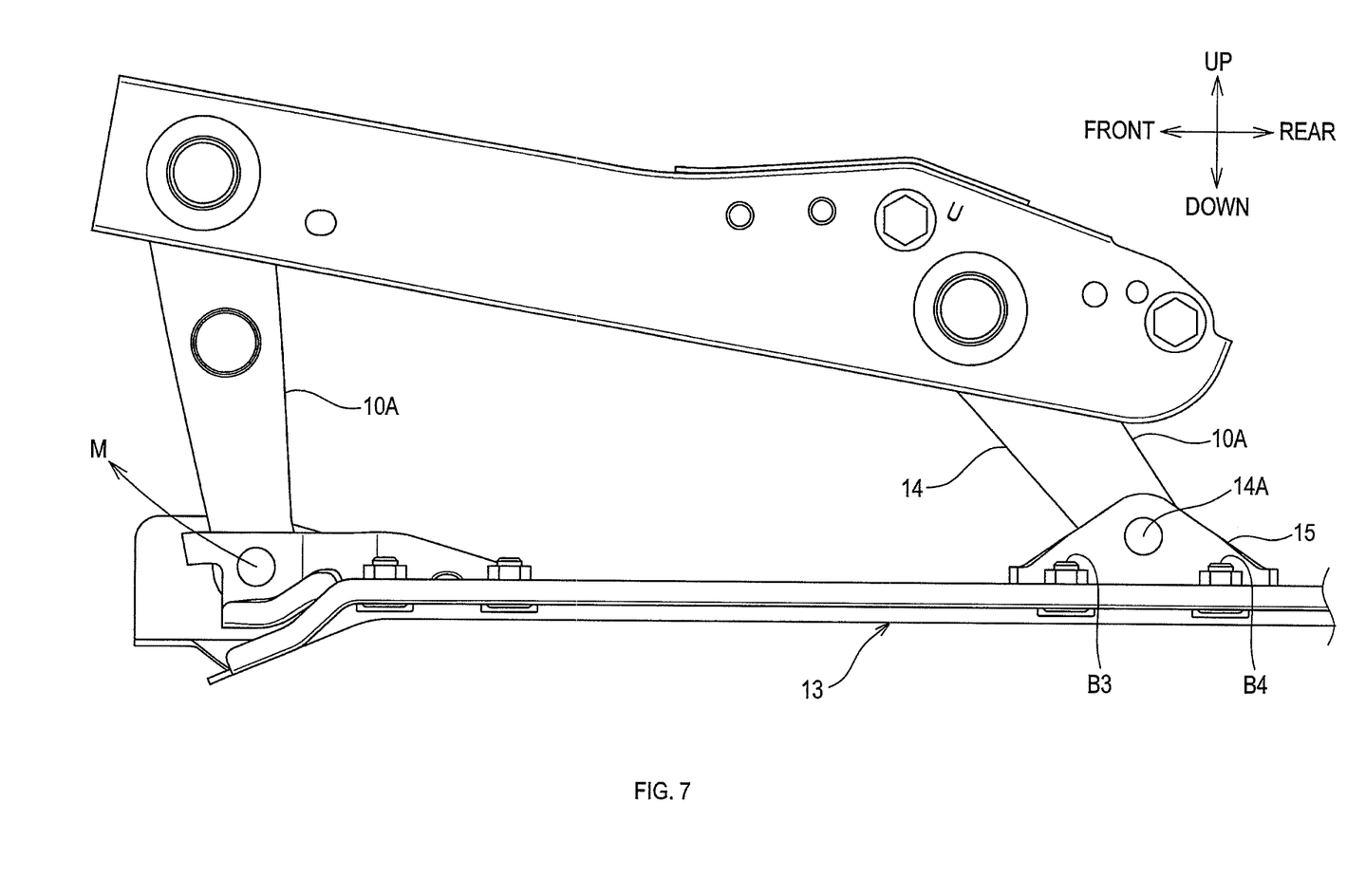
FIG. 7 is a side view of a cushion frame or the like of the vehicle seat according to the embodiment.

As shown in FIG. 7, the left rear leg portion 10C has a leg body 14, and a fixing bracket 15, The leg body 14 is a strip-shaped link member extending downward from the cushion frame 7.

An upper end in an extending direction of the leg body 14 is coupled to the cushion frame 7, that is, the left side frame 7A so that the leg body 14 can swing about the left side frame 7A. A lower end in the extending direction of the leg body 14 is coupled to the fixing bracket 15 so that the leg body 14 can swing about the fixing bracket 15.

The fixing bracket 15 is fixed to the base 13, a floor panel or the like by mechanical fasteners such as bolts B3, B4. The coupling portion 14A between the fixing bracket 15 and the leg body 14 is positioned between the bolts B3, B4.

According to the structure as above, if an upward tensile load is applied to the leg body 14, or if a downward compression load is applied to the leg body 14, a bending moment due to the load is hardly generated in the fixing bracket 15.

In the present embodiment, length dimension in the extending direction of the leg body 11 of the left front leg portion 10A is larger than length dimension in the extending direction of the leg body 14 of the left rear leg portion 10C. In a state in which the vehicle seat 1 is available (see FIG. 2), the upper ends of the leg bodies 11, 14 are located closer to the seat front side than the lower ends of the leg bodies 11, 14.

That is, in a state available for seating, the leg bodies 11, 14 are in a state tilted forward. In a state in which the vehicle seat 1 is stored, the upper ends of the leg bodies 11, 14 are moved closer to a seat rear side than the lower ends of the leg bodies 11, 14.

3. Characteristics of Vehicle Seat According to the Present Embodiment

In the present embodiment, the fixing portion 12A for fixing the leg body 11 of the left front leg portion 10A to the vehicle side is provided at a position displaced in the seat front-rear direction with respect to the leg body 11.

For this reason, a load F (see FIG. 1) applied to the back frame 9 is also applied to the left front leg portion 10A and the right front leg portion 10B via the cushion frame 7. The load F generates a bending moment M (see FIG. 7) on the left front leg portion 10A and the right front leg portion 10B.

On the other hand, the load applied to the leg portion according to Patent Document 1 acts as a tensile force on the leg portion.

When magnitudes of the loads are the same, bending stress caused by the load is usually larger than tensile stress caused by the load. Therefore, the left front leg portion 10A and the right front leg portion 10B have lower flexural rigidity than the leg portion according to Patent Document 1 with respect to a specific load.

Since energy due to the load F applied to the back frame 9 is generally distributed in accordance with magnitude of the flexural rigidity, a large amount of energy as compared to the prior art is distributed to a portion where flexural rigidity is lower than in the prior art.

Therefore, in the present embodiment, it is possible to disperse at least a part of the energy conventionally concentrated in a substantially central portion in the extending direction of the left side frame 7A and the right side frame 7B to the left front leg portion 10A and the right front leg portion 10B. It is possible to reduce stress concentration generated in the substantially central portion of the cushion frame 7 in the seat front-rear direction.

Since stress concentration generated in the substantially central portion in the seat front-rear direction of the cushion frame 7 can be reduced, it is not necessary to excessively increase flexural rigidity of the substantially central portion. In this case, a reinforcing member may not be provided in the left side frame 7A and the right side frame 7B.

The coupling portion 12B of the fixing bracket 12 to which the leg body 11 is coupled has higher flexural rigidity than the fixing portion 12A. Accordingly, the energy can be induced near a boundary between the coupling portion 12B and the fixing portion 12A. Stress concentration in the substantially central portion in the seat front-rear direction of the cushion frame 7 can be reliably reduced.

The gap 13A is provided between the bottom surface of the coupling portion 12B and the top surface portion of the base 13. As a result, it becomes possible to reliably bend and deform a portion corresponding to the coupling portion 12B of the fixing bracket 12 downward.

The fixing portion 12A is displaced in a seat rear direction with respect to the leg body 11. As a result, flexural rigidity of the left front leg portion 10A decreases as compared to a configuration in which the fixing portion 12A is displaced in a seat front direction with respect to the leg body 11. In this case, stress concentration in the substantially central portion in the seat front-rear direction of the cushion frame 7 can be reliably reduced. Needless to say, the configuration in which the fixing portion 12A is displaced in the seat front direction with respect to the leg body 11 can reduce stress concentration in the substantially central portion in the seat front-rear direction of the cushion frame 7, as compared to the prior art.

Other Embodiments

In the above-described embodiment, the fixing bracket 12 is provided with the fixing portion 12A. However, the present disclosure is not limited to this. For example, the fixing portion 12A may be provided on the leg body 11 formed into a substantially L shape.

In the fixing bracket 12 according to the above-described embodiment, the fixing portion 12A is provided on the rear end in the extending direction and the coupling portion 12B is provided on the front end in the extending direction. However, the present disclosure is not limited to this.

The fixing bracket 12, for example, may be a fixing bracket 12 having the fixing portion 12A at the front end in the extending direction and the coupling portion 12B at the rear end in the extending direction, or may be a fixing bracket 12 without the coupling portion 12B.

In the above-described embodiment, the fixing portion 12A is provided at the lower end of the leg body 11. However, the present disclosure is not limited to this. For example, the fixing portion 12A may be provided on an upper end of the leg body 11. In this case, the fixing portion 12A may be configured to fix the leg body 11 to the cushion frame 7.

The leg body 11 according to the above-described embodiment is swingably coupled to the cushion frame 7 and the vehicle side. However, the present disclosure is not limited to this. For example, the leg body 11 may be coupled to the cushion frame 7 and the vehicle side so as not to swing.

In the above-described embodiment, the left front leg portion 10A and the like are indirectly coupled to the vehicle side via the base 13. However, the present disclosure is not limited to this. For example, the left front leg portion 10A and the like may be directly coupled to the vehicle side without intervention of the base 13.

In the above-described embodiment, the gap 13A is provided between the bottom surface of the coupling portion 12B and the top surface portion of the base 13. However, the present disclosure is not limited to this. For example, there may be no gap between the bottom surface of the coupling portion 12B and the top surface portion of the base 13 (for example, the bottom surface of the coupling portion 12B and the top surface portion of the base 13 may be in contact with each other throughout).

In the above-described embodiment, the fixing portion 12A is provided on the left front leg portion 10A provided on the front end of the left side frame 7A. However, the present disclosure is not limited to this. The present disclosure can be applied any leg portion as long as it is provided closer to the seat front side than the back frame 9.

In the above-described embodiment, an example of a vehicle seat in a normal passenger car has been described. However, the present disclosure is not limited to this. The present disclosure can also be applied to other automobile seats or seats used for railway vehicles, vehicles such as ships and aircrafts.

The present disclosure is not limited to the embodiments described above and may be embodied in any ways without departing from the gist of the invention in the claims. Therefore, at least two of the above-described embodiments may be combined.

What is claimed is:

1. A vehicle seat to be mounted on a vehicle, the vehicle seat comprising:
   a cushion frame forming a frame of a seat cushion;
   a back frame forming a frame of a seatback and coupled to a seat rear end of the cushion frame; and
   a leg portion that couples the cushion frame to the vehicle side on a seat front side of the back frame, the leg portion including a leg body extending downward from the cushion frame and a fixing portion fixing the leg body to at least one of the cushion frame and the vehicle side, wherein an upper end of the leg body is swingably coupled to the cushion frame,
   wherein the fixing portion is provided on a fixing bracket, wherein a lower end of the leg body is swingably coupled to the fixing bracket, wherein the fixing portion is fixed to the vehicle side, wherein the fixing bracket has a coupling portion to which the leg body is coupled, and wherein the coupling portion has higher rigidity than the fixing portion, and
   the fixing portion being displaced in one of: a seat front direction and a seat rear direction with respect to the leg body.

2. The vehicle seat according to claim 1, further comprising
   a base that fixes the fixing bracket to the vehicle side, the fixing portion being fixed to the base,
   wherein a gap is provided between a bottom surface of the coupling portion and an top surface portion of the base.

3. The vehicle seat according to claim 1,
   wherein the fixing portion is displaced in the seat rear direction with respect to the leg body.

* * * * *